US012524281B2

(12) United States Patent
Riera et al.

(10) Patent No.: US 12,524,281 B2
(45) Date of Patent: Jan. 13, 2026

(54) C2MPI: A HARDWARE-AGNOSTIC MESSAGE PASSING INTERFACE FOR HETEROGENEOUS COMPUTING SYSTEMS

(71) Applicant: ARIZONA BOARD OF REGENTS ON BEHALF OF ARIZONA STATE UNIVERSITY, Scottsdale, AZ (US)

(72) Inventors: Michael F. Riera, Hialeah, FL (US); Fengbo Ren, Tempe, AZ (US); Masudul Hassan Quraishi, Tempe, AZ (US); Erfan Bank Tavakoli, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 545 days.

(21) Appl. No.: 17/799,098

(22) PCT Filed: Mar. 1, 2021

(86) PCT No.: PCT/US2021/020353
§ 371 (c)(1),
(2) Date: Aug. 11, 2022

(87) PCT Pub. No.: WO2021/174223
PCT Pub. Date: Sep. 2, 2021

(65) Prior Publication Data
US 2023/0074426 A1 Mar. 9, 2023

Related U.S. Application Data

(60) Provisional application No. 62/983,220, filed on Feb. 28, 2020.

(51) Int. Cl.
*G06F 9/54* (2006.01)
*G06F 9/38* (2018.01)
(Continued)

(52) U.S. Cl.
CPC ............ *G06F 9/541* (2013.01); *G06F 9/3836* (2013.01); *G06F 9/3877* (2013.01); *G06F 9/44* (2013.01);
(Continued)

(58) Field of Classification Search
None
See application file for complete search history.

(56) References Cited

U.S. PATENT DOCUMENTS 7,975,001 B1 * 7/2011 Stefansson ............... G06F 9/54
709/201
2010/0076915 A1 3/2010 Xu et al.
(Continued)

OTHER PUBLICATIONS

Heath Jr. et al., An overview of signal processing techniques for millimeter wave mimo systems, IEEE Journal of Selected Topics in Signal Processing, vol. 10, No. 3, Apr. 2016, pp. 436-453.
(Continued)

*Primary Examiner* — Lewis A Bullock, Jr.
*Assistant Examiner* — John Robert Dakita Ewald
(74) *Attorney, Agent, or Firm* — MH2 Technology Law Group, LLP

(57) ABSTRACT

Compute-centric message passing interface (C²MPI) provides a hardware-agnostic message passing interface for heterogeneous computing systems. Hardware-agnostic programming with high performance portability is envisioned to be a bedrock for realizing adoption of emerging accelerator technologies in heterogeneous computing systems, such as high-performance computing (HPC) systems, data center computing systems, and edge computing systems. The adoption of emerging accelerators is key to achieving greater scale and performance in heterogeneous computing systems. Accordingly, embodiments described herein provide a flexible hardware-agnostic environment that allows
(Continued)

application developers to develop high-performance applications without knowledge of the underlying hardware.

23 Claims, 8 Drawing Sheets

(51) Int. Cl.
 *G06F 9/44* (2018.01)
 *G06F 9/48* (2006.01)
 *G06F 9/50* (2006.01)
(52) U.S. Cl.
 CPC ............ *G06F 9/4881* (2013.01); *G06F 9/505* (2013.01); *G06F 9/545* (2013.01)

(56) References Cited

U.S. PATENT DOCUMENTS

| | | |
|---|---|---|
| 2011/0271263 A1 | 11/2011 | Archer et al. |
| 2012/0069029 A1* | 3/2012 | Bourd ................ G06F 9/544 345/502 |
| 2013/0073752 A1 | 3/2013 | Blocksome |
| 2019/0007334 A1 | 1/2019 | Guim Bernat et al. |

OTHER PUBLICATIONS

Rappaport et al., Wireless communications and applications above 100 ghz: Opportunities and challenges for 6g and beyond, IEEE Access, vol. 7, 2019, pp. 78 729-78 757.
Bai et al., Coverage and capacity of millimeter-wave cellular networks, IEEE Communications Magazine, vol. 52, No. 9, Sep. 2014, pp. 70-77.
Alrabeiah et al., Deep learning for TDD and FDD massive MIMO: mapping channels in space and frequency, CoRR, vol. abs/1905.03761, 2019, http://arxiv.org/abs/1905.03761, 10 pages.
Li et al., Deep Learning for Direct Hybrid Precoding in Millimeter Wave Massive MIMO Systems, CoRR, vol. abs/1905.13212, 2019, http://arxiv.org/abs/1905.13212, 7 pages.
Alkhateeb et al., Deep learning coordinated beamforming for highly-mobile millimeter wave systems, IEEE Access, vol. 6, 2018, pp. 37 328-37 348.
Alkhateeb et al., Machine learning for reliable mmwave systems: Blockage prediction and proactive handoff, IEEE GlobalSIP, arXiv preprint arXiv:1807.02723, 2018, 5 pages.
Taha et al., Enabling large intelligent surfaces with compressive sensing and deep learning, arXiv preprint, arXiv:1904.10136, 2019, 33 pages.
Alrabeiah et al., Deep learning for mmwave beam and blockage prediction using Sub-6GHZ channels, submitted to IEEE Transactions on Communications, arXiv e-prints, p. arXiv:1910.02900, Oct. 2019, 31 pages.
Ecklemann et al., V2v-communication, lidar system and positioning sensors for future fusion algorithms in connected vehicles, Transportation Research Procedia, vol. 27, 2017, pp. 69-76.
He et al., Deep residual learning for image recognition, Proceedings of the IEEE conference on computer vision and pattern recognition, 2016, pp. 770-778.
Russakovsky et al., Imagenet large scale visual recognition challenge, International journal of computer vision, vol. 115, No. 3, 2015, pp. 211-252.
Goodfellow et al., Deep Learning, 2016, book in preparation for MIT Press, available online at: http://www.deeplearningbook.org/.
Alrabeiah et al., Viwi: a deep learning dataset framework for vision-aided wireless communications, submitted to IEEE Vehicular Technology Conference, Nov. 2019, https://www.viwi-dataset.net/, 5 pages.
Paszke et al., Automatic differentiation in PyTorch, NIPS Autodiff Workshop, 2017, 4 pages.
Alrabeiah et al., mmWave Base Stations with Cameras, available online at: https://github.com/malrabeiah/CameraPredictsBeams, 3 pages.
Parkvall et al., "NR: The new 5G radio access technology," IEEE Communications Standards Magazine, vol. 1, No. 4, Dec. 2017. pp. 24-30.
Nakashima et al., "Impact of input data size on received power prediction using depth images for mm wave communications," in 2018 IEEE 88th Vehicular Technology Conference (VTC-Fall), Aug. 2018, pp. 1-5.
International Search Report and Written Opinion mailed May 18, 2021 in corresponding International Application No. PCT/US2021/020353, 12 pages.

\* cited by examiner

```
{
"host_list" : [
{"host_name" : "edge-1.cidse.dhcp.asu.edu", "port" : "8000",
"mode" : "ads_accel", "max_slots" : "1"},
{"host_name" : "turing-4.cidse.dhcp.asu.edu", "port" : "8000",
"mode" : "ads_accel", "max_slots" : "1"}
],
"func_list" : [
{"func_alias" : "MMM",     "sw_fid" : "12345", "func_repl":"1",
"platform_id" : "rr_scat"},
{"func_alias" : "EWMM",    "sw_fid" : "123456",    "platform_id" : "rr_scat"},
{"func_alias" : "SMMM",    "sw_fid" : "1234567",   "platform_id" : "rr_scat"},
{"func_alias" : "EWMD",    "sw_fid" : "12345678",  "platform_id" : "rr_scat"},
{"func_alias" : "VDP",     "sw_fid" : "123456789", "platform_id" : "rr_scat"},
{"func_alias" : "JS",      "sw_fid" : "123456789A","platform_id" : "rr_scat"},
{"func_alias" : "FC",      "sw_fid" : "123456789B","platform_id" : "rr_scat"},
{"func_alias" : "IDCONV",  "sw_fid" : "123456789C","platform_id" : "rr_scat"}
],
"platform_list" : []
}
```

FIG. 4

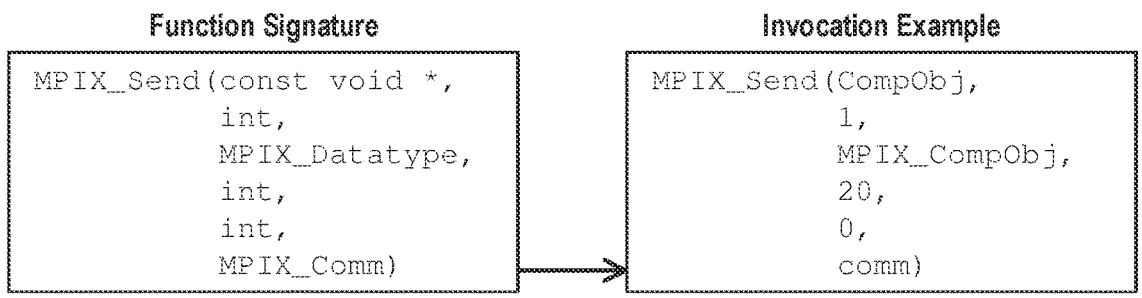
FIG. 5
FIG. 6
```
int MPIX_Claim(func_alias, failsafe_func,
               overrides, child_rank);
int MPIX_CreateBuffer(child_rank, is_signed,
                      is_float, type_size,
                      vector_size, child_rank_buf);
int MPIX_Free(child_rank);
```
FIG. 7

C²MPI: A HARDWARE-AGNOSTIC MESSAGE PASSING INTERFACE FOR HETEROGENEOUS COMPUTING SYSTEMS

RELATED APPLICATIONS

This application is a national stage entry under 35 U.S.C. § 371 of PCT Application No. PCT/US2021/020353 entitled "C²MPI: A HARDWARE-AGNOSTIC MESSAGE PASSING INTERFACE FOR HETEROGENEOUS COMPUTING SYSTEMS" filed Mar. 1, 2021, which claims the benefit of U.S. Provisional Application No. 62/983,220, filed Feb. 28, 2020, the disclosures of which is are hereby incorporated herein by reference in their entireties.

The present application is related to concurrently filed PCT Application No. PCT/US2021/020352 filed on Mar, 1, 2021, entitled "HALO: A HARDWARE-AGNOSTIC ACCLERARTOR ORCHESTRATION SOFTWARE FRAMEWORK FOR HETEROGENEOUS COMPUTING SYSTEMS, " U.S. patent application Ser. No. 17/799,081 filed on Aug. 11, 2022 entitled "HALO: A Hardware-Agnostic Accelerator Orchestration Software Framework for Heterogeneous Computing Systems," U.S. patent application Ser. No. 17/799,115 filed on Aug. 11, 2022 entitled "A Stand-Alone Accelerator Protocol (SAP) for Heterogeneous Computing Systems," and U.S. patent application Ser. No. 17/799,139 filed on Aug. 11, 2022 entitled "A Software-Defined Board Support Package (SW-BSP) for Stand-Alone Reconfigurable Accelerators," the disclosures of which are hereby incorporated herein by reference in their entireties.

FIELD OF THE DISCLOSURE

The present disclosure is generally related to heterogeneous computing systems, such as large-scale high-performance computing systems, data center computing systems, or edge computing systems which include specialized hardware.

BACKGROUND

Today's high-performance computing (HPC) systems are largely structured based on traditional central processing units (CPUs) with tightly coupled general-purpose graphics processing units (GPUs, which can be considered domain-specific accelerators). GPUs have a different programming model than CPUs and are only efficient in exploiting spatial parallelism for accelerating high-concurrency algorithms but not the temporal/pipeline parallelism vital to accelerating high-dependency algorithms that are widely used in predictive simulations for computational science. As a result, today's HPC systems still have huge room for improvement in terms of performance and energy efficiency for running complex scientific computing tasks (e.g., many large pieces of legacy HPC codes for predictive simulations are still running on CPUs).

In recent years, a few more accelerator choices for heterogeneous computing systems (e.g., HPC and other large-scale computing systems) have emerged, such as field-programmable gate arrays (FPGAs, which can be considered reconfigurable accelerators) and tensor processing units (TPUs, which can be considered application-specific accelerators). Although these new accelerators offer flexible or customized hardware architectures with excellent capabilities for exploiting temporal/pipeline parallelism efficiently, their adoption in extreme-scale scientific computing is still at its infancy and is expected to be a tortuous process (as was adoption of GPUs) regardless of their superior performance and energy efficiency benefits.

FIG. 1 is a diagram illustrating divergent execution flows of hardware-optimized application codes in existing HPC systems. The fundamental challenge to the adoption of any new accelerators in HPC, such as FPGAs and TPUs, is that each accelerator's programming model, message passing interface, and virtualization stack is developed independently and is specific to the respective hardware architecture. With the lack of clarity in the demarcation between hardware-specific and hardware-agnostic development regions, today's programming models require domain-matter experts (DMEs) and hardware-matter experts (HMEs) to work interdependently to make a significant effort in optimizing hardware-specific codes in order to adopt new accelerator devices in HPC and gain performance benefits. This tangled association is a self-imposed bottleneck from existing programming models that impairs a future in true heterogeneous HPC and severely impacts the velocity of scientific discovery.

SUMMARY

Compute-centric message passing interface (C²MPI) provides a hardware-agnostic message passing interface for heterogeneous computing systems. Hardware-agnostic programming with high performance portability is envisioned to be a bedrock for realizing adoption of emerging accelerator technologies in heterogeneous computing systems, such as high-performance computing (HPC) systems, data center computing systems, and edge computing systems. The adoption of emerging accelerators is the key to achieving greater scale and performance in heterogeneous computing systems. Accordingly, embodiments described herein provide a flexible hardware-agnostic environment that allows application developers to develop high-performance applications without knowledge of the underlying hardware.

C²MPI provides a message passing specification for hardware-agnostic accelerator orchestration (HALO), an open-ended extensible multi-agent software framework that implements a set of proposed hardware-agnostic principles for enabling the portable and performance-optimized execution of hardware-agnostic application host codes across heterogeneous accelerator resources. The platform developed herein provides hardware-agnostic virtualization, routing, and arbitration layers, as well as hardware-centric partitioning and a scaling layer. Most importantly, the platform allows for new hardware accelerators to be plug-and-playable for application acceleration across any network infrastructure.

An exemplary embodiment provides a method for providing instructions for a host application to a heterogeneous computing system via C²MPI. The method includes providing a first hardware-agnostic instruction to invoke a first child rank corresponding to a first accelerator resource, wherein the first hardware-agnostic instruction specifies a first computational function.

Another exemplary embodiment provides a method for executing instructions for an application on a heterogeneous computing system received via C²MPI. The method includes receiving, from a host application, a first hardware-agnostic instruction to invoke a first child rank corresponding to a first accelerator resource, wherein the first hardware-agnostic instruction specifies a first computational function; and locating the first accelerator resource based on the first computational function.

Another exemplary embodiment provides a non-transitory computer-readable medium having stored thereon software instructions that, when executed by a processor, cause the processor to: receive, from a host application, a first hardware-agnostic instruction to invoke a first child rank corresponding to a first accelerator resource, wherein the first hardware-agnostic instruction specifies a first computational function; locate the first accelerator resource based on the first computational function; invoke the first child rank; and return the first child rank to the host application.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 illustrates an example configuration file defining parent and child ranks using a compute-centric message passing interface ($C^2MPI$) specification according to embodiments described herein.

FIG. 5 illustrates an exemplary data-movement interface for $C^2MPI$.

FIG. 6 illustrates an exemplary message flow for MPIX_Send, MPIX_Recv, and MPIX_SendFwd using the data-movement interface of FIG. 4.

FIG. 7 illustrates exemplary approaches to support allocation and deallocation of virtual accelerator resources.

DETAILED DESCRIPTION

Figure 1:
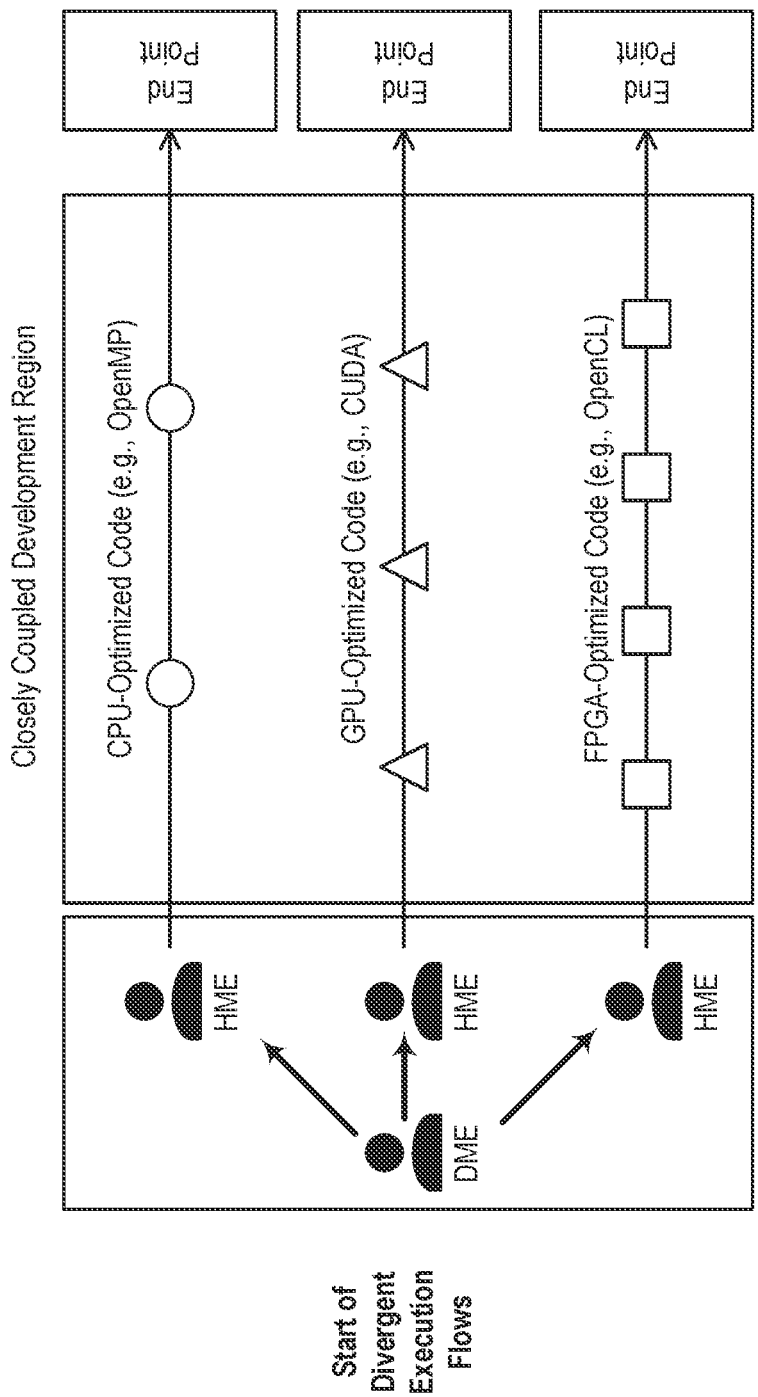
FIG. 1 is a diagram illustrating divergent execution flows of hardware-optimized application codes in existing high-performance computing (HPC) systems.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Compute-centric message passing interface ($C^2MPI$) provides a hardware-agnostic message passing interface for heterogeneous computing systems. Hardware-agnostic programming with high performance portability is envisioned to be a bedrock for realizing adoption of emerging accelerator technologies in heterogeneous computing systems, such as high-performance computing (HPC) systems, data center computing systems, and edge computing systems. The adoption of emerging accelerators is key to achieving greater scale and performance in heterogeneous computing systems. Accordingly, embodiments described herein provide a flexible hardware-agnostic environment that allows application developers to develop high-performance applications without knowledge of the underlying hardware.

C²MPI provides a message passing specification for hardware-agnostic accelerator orchestration (HALO), an open-ended extensible multi-agent software framework that implements a set of proposed hardware-agnostic principles for enabling the portable and performance-optimized execution of hardware-agnostic application host codes across heterogeneous accelerator resources. The platform developed herein provides hardware-agnostic virtualization, routing, and arbitration layers, as well as hardware-centric partitioning and a scaling layer. Most importantly, the platform allows for new hardware accelerators to be plug-and-playable for application acceleration across any network infrastructure. This platform facilitates dynamic plugin of an accelerator onto the network fabric, which can be auto-discovered and utilized by applications.

I. Introduction

HPC and other large-scale computing system applications have become increasingly complex in recent years. Predictive simulations with increasingly higher spatial and temporal resolutions and ever-growing degrees of freedom are the critical drivers for achieving scientific break-through. The latest advancements in deep learning paired with the next-generation scientific computing applications will inevitably demand orders of magnitude more compute power for future computing infrastructure. In the concluding days of Moore's law, general-purpose solutions will no longer be viable for continuing to meet such an exponential growth in performance that is required to keep pace with scientific innovations. This disclosure envisions that extreme-scale heterogeneous computing systems (e.g., HPC systems, data center computing systems, edge computing systems) that massively integrate various domain- and application-specific accelerators will be a viable blueprint for providing the necessary performance and energy efficiency to meet the challenges of future applications.

However, as described with respect to FIG. 1, the path to realizing extreme-scale heterogeneous computing systems is tortuous. The main obstacle towards the proliferation of heterogeneous accelerators is the lack of a flexible hardware-agnostic programming model that separates the hardware-specific and performance-critical portion of an application from its logic flow, causing these divergent execution flows between both domain matter experts (DMEs) and hardware matter experts (HMEs). As a result, HPC and other large-scale computing system applications are by no means extensible with regard to new accelerator hardware.

This disclosure envisions that hardware-agnostic programming with high-performance portability will be the bedrock for realizing the pervasive adoption of emerging accelerator technologies in future heterogeneous computing systems. The proposed approach includes hardware-agnostic programming paired with a programming model that enables application developers and scientists to focus on conditioning and steering data to and from hardware-specific code without any assumption of the underlying hardware. Data conditioning and steering refers to the reorganization and movement of data within an application.

Additionally, performance portability is defined in the strictest sense as the ability for the host code to maintain a single hardware-agnostic control flow, as well as state-of-the-art kernel performance, regardless of platform and/or scale. Additionally, performance portability includes the ability to dynamically handle various accelerators without recompilation of the host code. This is in stark contrast to the current definition that allows for multiple control flows and recompilation processes.

Figure 2:
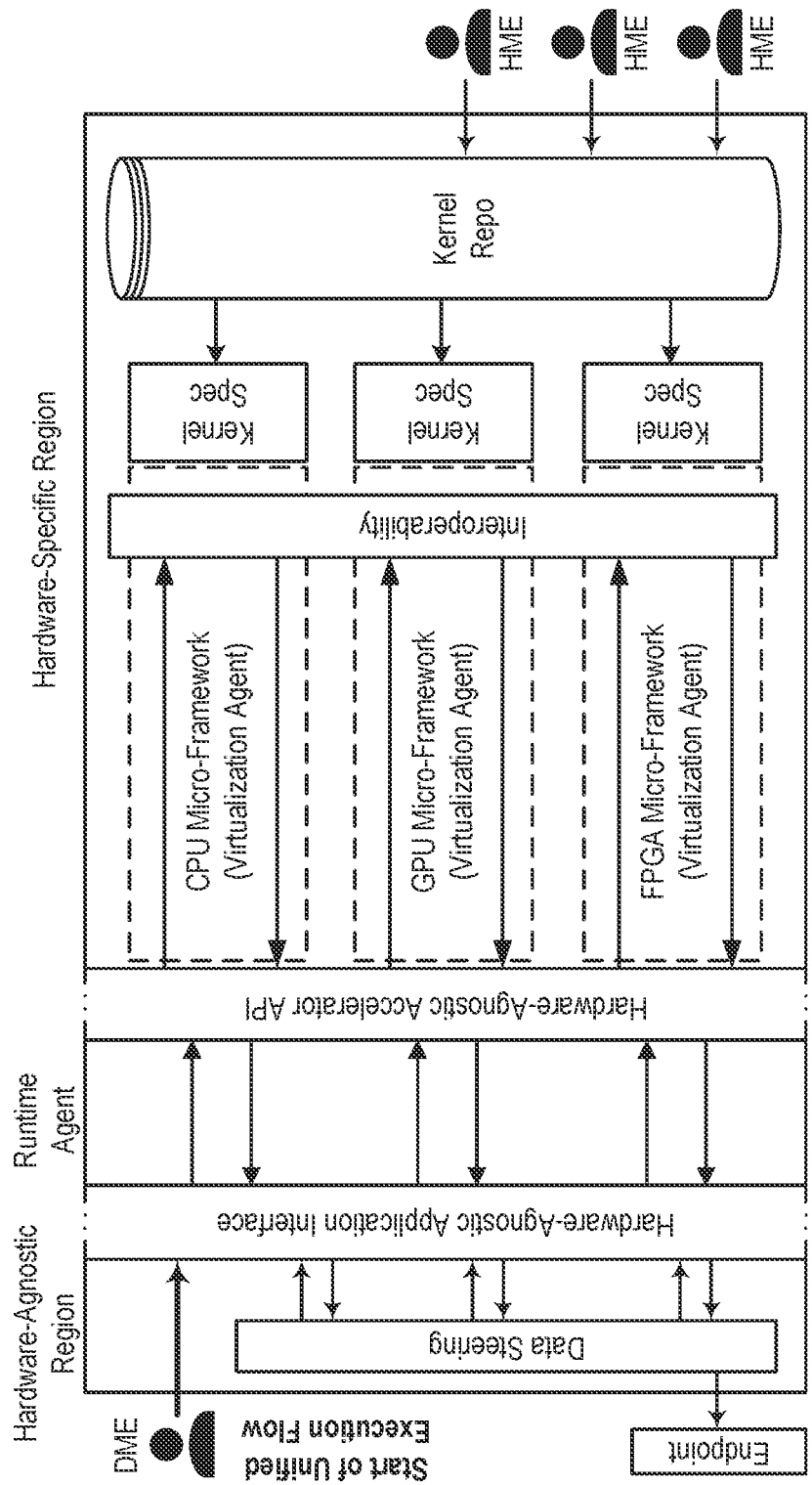
FIG. 2 is a diagram illustrating unified execution flow of hardware-agnostic application codes provided by embodiments described herein.

FIG. 2 is a diagram illustrating unified execution flow of hardware-agnostic application codes provided by embodiments described herein. This disclosure proposes the HALO framework from a set of hardware-agnostic principles and the C²MPI specification for enabling host code hardware-agnostic programming with true performance portability in the context of heterogeneous computing systems. The proposed hardware-agnostic principles impose a clear demarcation between hardware-specific and hardware-agnostic software development to allow DMEs and HMEs to work independently in completely decoupled development regions to significantly improve practicability, productivity, and efficiency.

To accomplish this, DMEs are restricted to conditioning and steering (orchestrating) data in and out of functional abstractions of hardware-optimized kernels. The hardware-agnostic abstraction of kernels in this regard can be defined by a label and its inputs, outputs, and state variables. Such a functional approach to hardware-agnostic programming is the key to the clear division between the responsibility of DMEs and HMEs. As a result, HMEs will focus on optimizing hardware-specific kernel implementations in their optimal programming environments while being able to eliminate the adoption barrier by leveraging the HALO framework via a unified hardware-agnostic accelerator interface. Furthermore, DMEs will focus on application or algorithm development while being able to maintain a single code flow and effortlessly reap the performance benefits of new hardware accelerators by leveraging the HALO framework via a unified hardware-agnostic application interface.

The proposed C²MPI specification defines both of the two interfaces and is a compute-centric extension to the traditional MPI specification. It builds upon the MPI paradigm by adding notions of heterogeneous ranks, in a parent-child relationship and a distributed remote procedure call (DRPC) execution model for simplicity and ease of adoption. The C²MPI specification not only unifies data computation and communication but also provides unified interfaces for enabling hardware-agnostic programming and transparent interoperability between accelerator resources.

A. Heterogeneous Computing System

Figure 3:
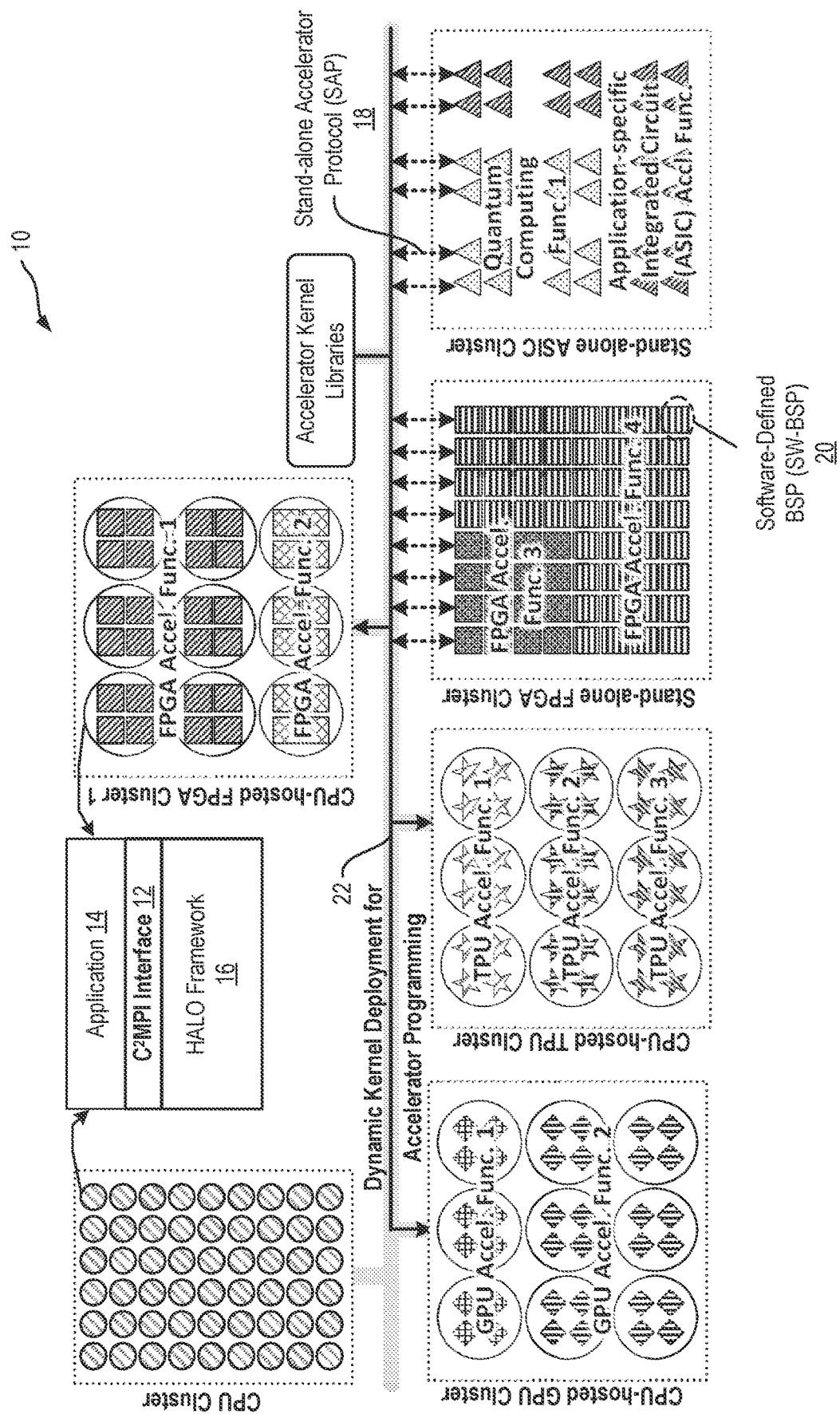
FIG. 3 is a schematic diagram of an exemplary heterogeneous computing system according to embodiments described herein.

FIG. 3 is a schematic diagram of an exemplary heterogeneous computing system 10 according to embodiments described herein. The heterogeneous computing system 10 provides hardware-agnostic system environments through a C²MPI interface 12 with an application 14, a HALO framework 16, a stand-alone accelerator protocol (SAP) 18, and a software-defined board support package (SW-BSP) 20 for reconfigurable accelerators. These technologies provide a multi-stack software framework that includes stacks of core system agents with a modular architecture for hardware-agnostic programming and transparent execution with performance portability, interoperability, scalability, and resiliency across an extreme-scale heterogeneous computing system.

The communication message passing interface of various accelerators is unified for the heterogeneous computing system 10 by implementing the C²MPI interface 12. The HALO framework 16 is provided as an open-ended extensible multi-agent software framework that implements the proposed HALO principles and C²MPI specification for enabling the portable and performance-optimized execution of hardware-agnostic application codes across heterogeneous computing devices. Dual-agent embodiments of the HALO framework 14 include two system agents, i.e., a runtime agent and a virtualization agent, which work asynchronously in a star topology. The runtime agent is responsible for implementing and offering the C²MPI interface 12, as well as being the crossbar switch for application processes and virtualization agents. The runtime agent also manages system resources, including device buffers, accelerator manifests, kernels, etc. The virtualization agent provides an asynchronous peer that encapsulates hardware-specific compilers, libraries, runtimes, and drivers. The runtime and virtualization agents implement common inter-process communication (IPC) channels for interoperability between multiple virtualization agents, which allows HALO to scale the number of accelerator types supported while maintaining the simplicity and structure of the framework.

Multi-agent embodiments of the HALO framework 14 consist of a set of core system agents (i.e., runtime agent, bridge agent, accelerator agent, virtualization agent) implementing a plug-and-play architecture for the purpose of scale and resiliency. The runtime agent and virtualization agent operate similar to dual-agent embodiments. The purpose of the bridge agent is to interoperate between the central processing unit (CPU) and accelerator domains. The primary responsibility of the accelerator agent is to interconnect the entire accelerator domain and provide interoperability among heterogeneous accelerators across multiple nodes.

SAP 18 provides a new architectural standard for scalable stand-alone accelerators, facilitating implementation of large clusters of stand-alone accelerators via a network 22. Reconfigurable accelerators can implement the SAP using SW-BSP 20.

B. Definitions

The following terms are defined for clarity:
Programming Model: The programming methodology used to construct a unified execution flow at the host code level using HALO.
Portability: The ability of a host program (code) to remain unmodified and operational regardless of the underlying hardware.
Performance Portability: The ability of an application to maintain a high performance relative to the respective hardware-optimized implementations across different computing devices without needing to modify the host code nor redeploy binaries.
Agent: An asynchronous process running on an operating system that takes its input from an IPC channel (i.e., a forked process).
Micro-Framework: The software framework encapsulating an external runtime, library, and/or software framework that is used as the final stage of the virtualization agent to communicate beyond the HALO boundaries.
DME: An application developer or scientist that focuses on conditioning and steering data for pre-defined processing and analytics for scientific discovery.
HME: An optimization and/or hardware expert that focuses on developing performance-critical, hardware-optimized device kernels for the data processing and analytics subroutines needed by DMEs.

C. Message Passing Interface (MPI) Specification

MPI defines a standard interface for data movement. MPI has been developed, extended, and refined from 1996 to the present by various organizations, including academic researchers (e.g., Argonne National Laboratory (ANL), Lawrence Livermore National Laboratory (LLNL), University of Tennessee, Cornell University, and University of Edinburgh), library developers (e.g., IBM, Intel, and Cray), and application developers across the HPC spectrum. MPI defines a robust set of interfaces for allocating, sending, and receiving data from CPU processes and exotically from GPUs only. Legacy MPI does not support interoperability of heterogeneous accelerators nor does it have a kernel execution model for said accelerators.

The proposed C²MPI specification extends the capabilities of MPI from communication libraries to a hardware-agnostic programming model. C²MPI introduces a heterogeneous ranking system and a kernel execution model that will enable developers to claim and invoke accelerator resources as an abstracted function-specific subroutine. Some embodiments of C²MPI are designed as an extension of the legacy MPI to simplify and ease the adoption of HALO into existing MPI-enabled applications and minimize the learning curve for developers. In other embodiments, other data interfaces may be similarly adapted to facilitate hardware-agnostic programming. C²MPI seizes on the notion of ranks and introduces heterogeneous ranks to represent accelerator resources. Levering C²MPI, HALO inherits the coherency, synchronization, and caching semantics from the legacy MPI.

D. Remote Procedure Calls

Remote procedure call (RPC) is a protocol that is commonly used in a client-server system where clients can offload tasks to a remote entity (e.g., a server). It is a great way to distribute tasks among remote servers and/or peers. They are widely used in web browsers, cloud services (e.g., gRPC), software-as-a-service platforms, container orchestration (e.g., Kubernetes), massively distributed databases (e.g., Oracle), high-performance parallel computing offload programming models, and libraries. Typically, RPC-based software frameworks (e.g., Azure Databricks, Google AI platform, Apache swarm) are used to provide an interface to clients to issue payload, command pairs and have them executed remotely. Similarly, HALO leverages the RPC protocol to encapsulate and remotely execute kernels among a network of agent software processes in a peer-to-peer manner.

II. HALO Principles

HALO principles are the principles to keep in mind when developing hardware-agnostic specifications, programming models, and frameworks. The hallmarks of a hardware-agnostic system are to maintain an interface definition devoid of any vendor-specific, hardware-specific, or computational-task-specific implementations or naming conventions. Interfaces must also be domain-agnostic such that method signatures do not imply functionality but a delivery vehicle. For instance, a method called "execute (kernel1, parameter 1 ... N)" is domain-agnostic, however, "kernel1 (parameter1 ... N)" is not. Additionally, hardware-agnostic and hardware-specific regions must be clearly defined and decoupled with a robust interoperation protocol.

Lastly, abstract functionality must be inclusive to procedures that operate on data and change state. Being domain-agnostic will allow for enormous flexibility and extensibility required to maintain an open-ended HALO software architecture, where HMEs can easily extend the overall system with new accelerator devices and kernel implementations. The purposes of a hardware-agnostic programming model are twofold. The first is to minimize the amount of hardware-dependent software in a codebase while maximizing the portability of the host code across heterogeneous computing devices. The second is to clearly separate the functional (non-performance-critical) and computational (performance-critical) aspects of the application to simplify the adoption of new accelerator hardware as well as the development and integration of hardware-specific and hardware-optimized interfaces/kernels.

III. $C^2$MPI Specification

A. Overview $C^2$MPI defines unified, domain- and hardware-agnostic interfaces for interfacing, marshaling data, allocating local and remote memory, and executing kernels on heterogeneous computing systems. $C^2$MPI combines two main interface definitions: a unified application interface for DMEs and a unified accelerator interface for HMEs. To realize such an interface, $C^2$MPI must be domain-agnostic, which refers to the interfaces not being specific to any functional aspect of the underlying kernel. As an opposite example, naming an interface method cblas_gemm is not domain-agnostic. Additionally, $C^2$MPI must also be hardware-agnostic, which refers to the interfaces not being bounded to specific hardware. cudaMalloc for memory management, as an opposite example, is not hardware-agnostic.

Formally, $C^2$MPI provides a set of interface definitions that application, framework, and accelerator developers can all agree upon to facilitate the allocation of system resources. $C^2$MPI fuses data marshaling and kernel invocation interfaces to allow the developers to allocate and manipulate optimal accelerator resources without embedding hardware-specific optimization into application codes.

$C^2$MPI leverages MPI semantics to enable domain and hardware agnosticism by utilizing a unified interface applicable to all types of accelerators. System resources can be allocated, marshaled, and invoked through the unified interface. The specification includes two types of system resources: 1) handles to functional code segments (a.k.a. kernels); 2) buffer and kernel pipeline allocations. Furthermore, since $C^2$MPI adopts and extends the legacy MPI specification and interfaces, careful considerations are taken to integrate compute-centric capabilities while maintaining backward compatibility with function signatures, programming models, and the overall MPI semantics to facilitate a unified programming model at any scale.

With legacy MPI in mind, $C^2$MPI unifies communication and computation orchestration between accelerators and general-purpose CPUs through a heterogeneous parent-child ranking system that describes all computation resources as ranks. Parent ranks can allocate and manage child ranks. The $C^2$MPI specification is defined by two sub-specifications: one for application parent processes and the other for the accelerator parent processes.

B. Parent Ranks

Application parent ranks live inside the hardware-agnostic region of the application. Application parent ranks are not guaranteed to be performance-portable. Application parent ranks are synonymous with traditional MPI ranks. An application includes one or more host application processes, each of which can be associated with a parent rank. As used herein, "host application process" refers to a CPU process running a hardware-agnostic host application. Several such host application processes with different parent ranks may be running in parallel or as interconnected pipelines across one or a cluster of CPUs. Parent ranks have the full capabilities of a typical MPI-based rank process along with the added capabilities for child rank management. Both application and accelerator processes can allocate and manage child ranks.

Accelerator parent ranks, in addition to managing their own child ranks, have the added responsibilities of hardware management, kernel retrieval, registration, and execution and maintaining system resources allocated by application parent ranks. Similar to MPI-based applications, jobs can instantiate multiple application parent ranks, and each parent rank can be multi-threaded, making requests into the child management system asynchronously. Therefore, the $C^2$MPI interfaces are thread-safe. In some embodiments, $C^2$MPI does not allow system resources to be shared across the boundary of parent ranks. In other embodiments, $C^2$MPI is extended to enable resource sharing across parent ranks.

C. Child Rank

Child ranks are the virtual abstraction of a system resource in the form of an opaque handle, similar to a parent rank, but with limited capabilities. Such a system resource is not inherently tied to any physical resource at runtime, and the runtime agent has full authority to move both functionality and allocation to compatible accelerators on the network while assuring computation integrity. Child ranks can be allocated via an application or accelerator parent rank, with both having the lifespan of the job issuing requests. Child ranks can represent a single resource or a set of resources in parallel or pipeline. A pipeline of resources is a series of dependent kernel invocations. Each child rank can be associated with a hardware accelerator process, which refers to a process running on an accelerator (e.g., GPU, ASIC, TPU, FPGA, etc.) which has been programmed to execute a particular function. Child ranks can be deallocated via $C^2$MPI interfaces, and the resources are freed when MPIX_Finalize gets executed.

FIG. 4 illustrates an example configuration file defining parent and child ranks using the $C^2$MPI specification according to embodiments described herein. Child ranks have attributes that can be defined statically from a configuration file or dynamically at runtime. Refer to Table 1 for the attribute list and the description for the resource selection process. Developers can create an alias for resources and specify kernels and optional executor via a configuration file defining kernel attributes. Child rank management uses these attributes to allocate resources according to the resource alias. The example of FIG. 3 merges the legacy MPI host file with the accelerator manifest to provide a unified configuration file for end-users.

TABLE 1

Kernel Attributes for kernel selection process

| Kernel Attribute | Description |
| --- | --- |
| VID | Hardware Vendor ID |
| PID | Hardware Product ID |
| SS_VID | Hardware Sub-System Vendor ID |
| SS_PID | Hardware Sub-System Product ID |
| SW_VID | Software Vendor ID |
| SW_PID | Software Product ID |
| SW_FID | Software Function ID |
| SW_CLID | Software Class ID |
| SW_VERID | Software Version ID |

The configuration file is broken into three sections. The first section is the host list, which is synonymous with the MPI host file. The second section is the resource list for child rank definitions. The third section contains system configuration details, which configures the hardware recommendation strategy for allocating resources. Finally, each invokable resource must either have a functional or class identification (sw_fid, sw_clid) in the configuration file as these IDs are the main mechanism for resource lookup. If the function or class identifier cannot be located in the runtime agent manifest, the user-defined function will execute in a fail-safe mode to assure system resilience and maintain functional portability for that specific kernel.

D. Unified Compute-Object Structure and Enumerations

The compute-object and its associated enumerations are the primary vehicles for generalizing and encapsulating all arguments to construct complex RPCs (described further below with respect to FIG. 8). "Complex" refers to the kernel invocations that have multiple applications and system resources associated with the request.

MPIX_ComputeObj implements a reflective pattern to encapsulate and extend the type erasure techniques used in legacy MPI. The unified compute object makes marshaling straight forward when communicating RPCs among parent ranks. The enumerations (MPIX_TYPES) are used to differentiate between internal and external buffers. Internal buffers are managed by the HALO framework, and external buffers are managed by the parent ranks. Both buffers can also persist across multiple kernel invocations represented in the compute-object by a handle, be allocated by MPIX_CreateBuffer, and be described with an enumeration prefixed by internal buffers. Compute-objects that use only external buffers are considered stateless RPC invocations, and those with internal buffers are considered stateful RPC invocations.

E. Data-Movement Interface

FIG. 5 illustrates an exemplary data-movement interface for $C^2$MPI. The backbone of $C^2$MPI is the point-to-point communication between parent and child ranks using MPIX_Send and MPIX_Recv methods. These methods maintain the signature of their legacy MPI counterparts. The compute-centric extension of these methods comes into perspective during the invocation when the unified compute-object, enumerations, and target child ranks are applied. The compute-object can be marshaled to and from child and parent ranks via these two methods.

FIG. 6 illustrates an exemplary message flow for MPIX_Send, MPIX_Recv, and MPIX_SendFwd using the data-movement interface of FIG. 4. When using an MPIX_Send, the resulting compute-object returns to the source parent rank by default. To forward the compute-object to a different parent rank, one can use the MPIX_SendFwd method. The MPIX_SendFwd method looks similar to the MPIX_Send interface with an added parameter for the destination parent rank. Note that one can bypass using the unified compute-object when RPCs are simple structures or single array buffers and pass payloads as one would with traditional MPI. The single-input optimization saves the step of encapsulating a multi-input payload.

Similar to MPI, the tagging mechanism can be used to retrieve results from multiple MPIX_Send out of order or from different threads. Transmissions can be set with a certain tag such that a MPIX_Recv can be used to retrieve data out of order. Repeated calls to MPIX_Recv with the same tag will result in a first-in-first-out (FIFO) behavior.

F. Resource Allocation/Deallocation Interface

FIG. 7 illustrates exemplary approaches to support allocation and deallocation of virtual accelerator resources. There are three methods to support the allocation of virtual accelerator resources: MPIX_Claim, MPIX_CreateBuffer, and MPIX_Free. The MPIX_Claim interface takes in an alias tag that references an entry in the configuration file's func_list (see FIG. 3) that describes the details of the virtual channel (child rank) using the kernel attributes in Table 1. These parameters can be overwritten at runtime through the MPI_Info argument. In addition, MPIX_Claim accepts a fail_safe callback that takes in a unified compute object and outputs a unified compute-object in case no accelerator resources are available. MPIX_Claim returns a status and a handle to the child rank used in the data movement interface. These child ranks are stateless by default.

MPIX_CreateBuffer is an interface to allocate internal memory. This resource can be associated with the HALO framework or other child ranks. Passing a zero as a child rank handle will allow the method to associate the memory allocation to the HALO framework. MPIX_CreateBuffer is the main vehicle for creating a state from a stateless child rank, created by MPIX_Claim. Finally, MPIX_Free takes in a child rank, deallocates the resource, and returns null as a handle.

IV. Flow Diagrams

Figure 8:
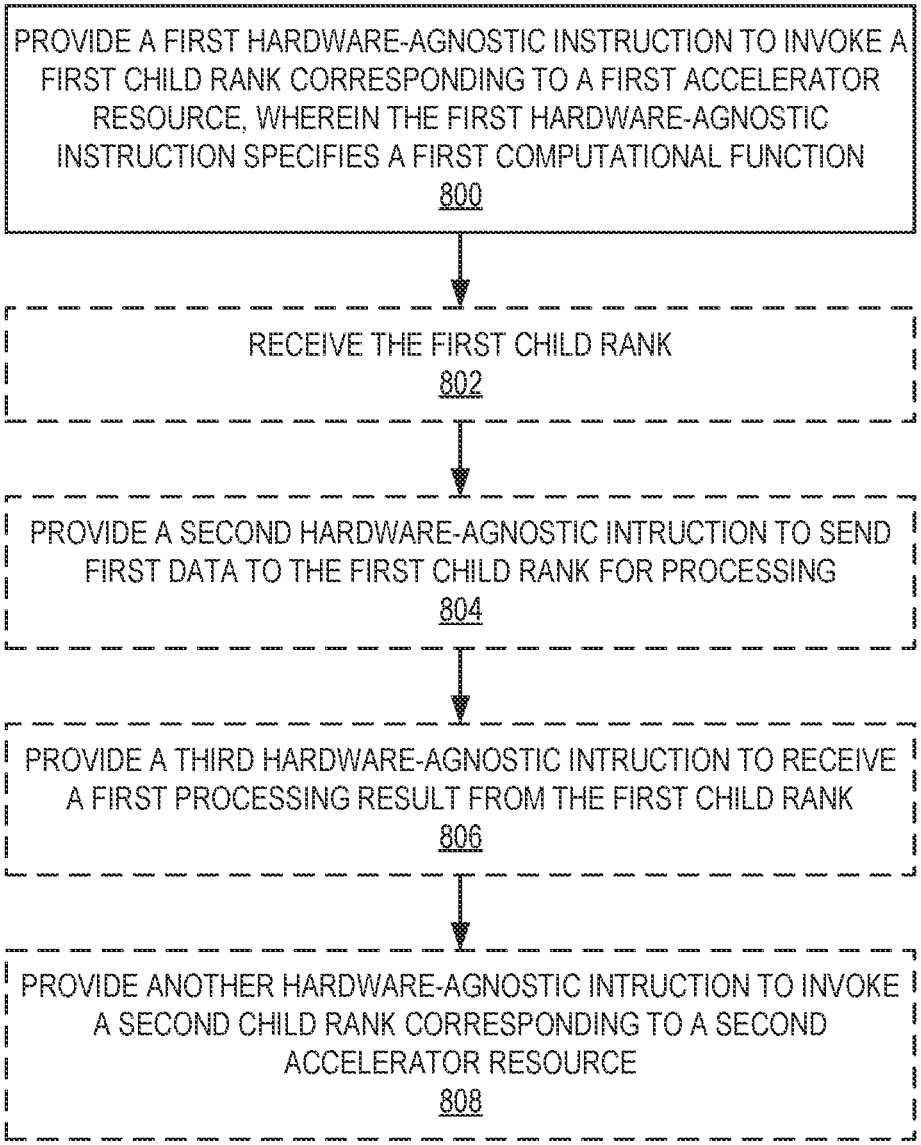
FIG. 8 is a flow diagram of a process for providing instructions for an application to a heterogeneous computing system via $C^2MPI$.

FIG. 8 is a flow diagram of a process for providing instructions for an application to a heterogeneous computing system (e.g., a HPC, data center, or edge computing system) via $C^2$MPI. Dashed boxes represent optional steps. The process begins at operation 800, with providing a first hardware-agnostic instruction to invoke a first child rank corresponding to a first accelerator resource, wherein the first hardware-agnostic instruction specifies a first computational function. The process optionally continues at operation 802, with receiving the first child rank (e.g., from a HALO agent). The process optionally continues at operation 804, with providing a second hardware-agnostic instruction to send first data to the first child rank for processing.

The process optionally continues at operation 806, with providing a third hardware-agnostic instruction to receive a first processing result from the first child rank. The process optionally continues at operation 808, with providing another hardware-agnostic instruction to invoke a second child rank corresponding to a second accelerator resource.

Figure 9:
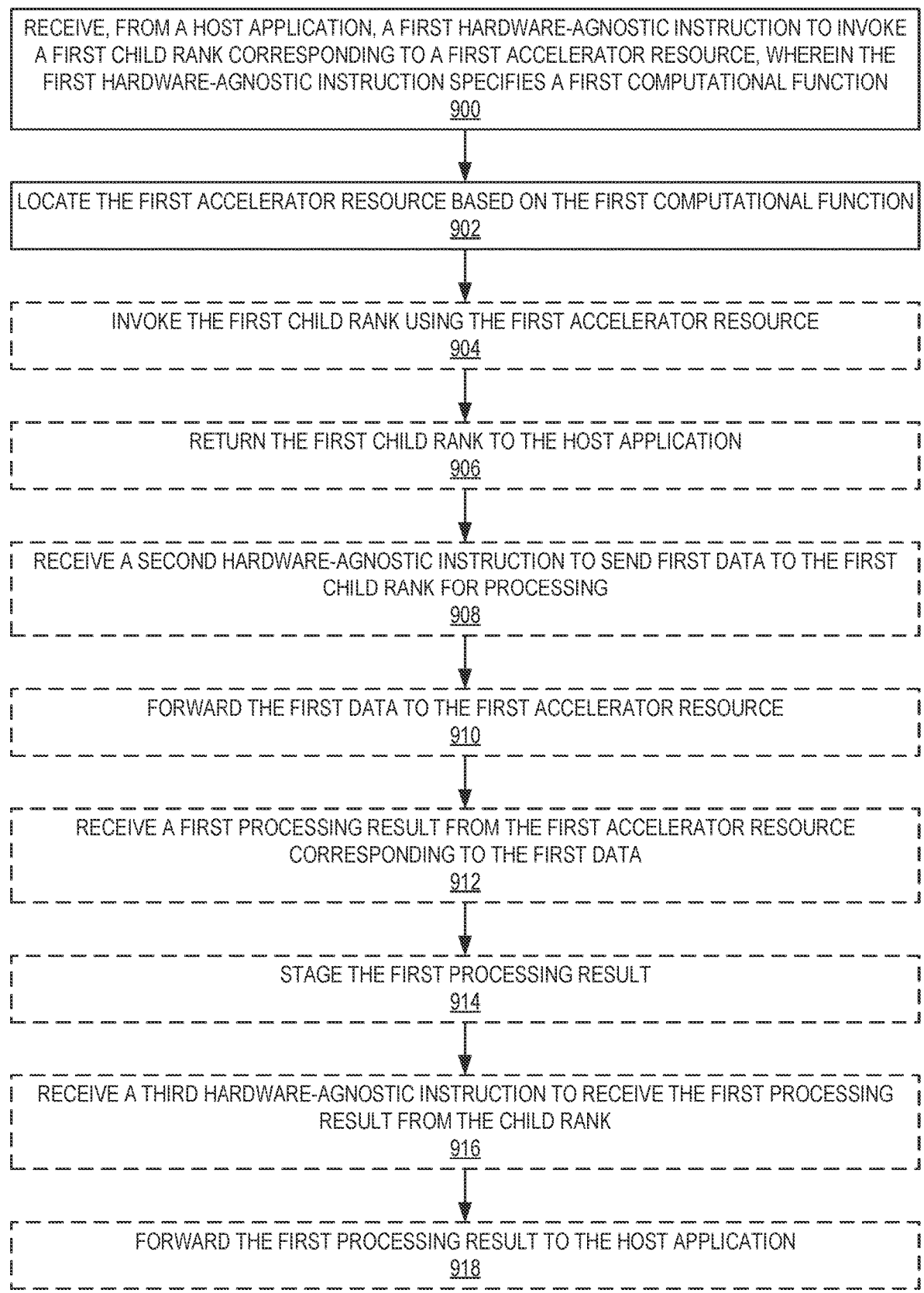
FIG. 9 is a flow diagram of a process for executing instructions for an application on a heterogeneous computing system via $C^2MPI$.

FIG. 9 is a flow diagram of a process for executing instructions for an application on a heterogeneous computing system (e.g., a HPC, data center, or edge computing system) via $C^2$MPI. The process begins at operation 900, with receiving, from a host application, a first hardware-agnostic instruction to invoke a first child rank corresponding to a first accelerator resource, wherein the first hardware-agnostic instruction specifies a first computational function. The process continues at operation 902, with locating the first accelerator resource based on the first computational function.

The process optionally continues at operation 904, with invoking the first child rank using the first accelerator resource. The process optionally continues at operation 906, with returning the first child rank to the host application. The process optionally continues at operation 908, with receiving a second hardware-agnostic instruction to send first data to the first child rank for processing. The process optionally continues at operation 910, with forwarding the first data to the first accelerator resource.

The process optionally continues at operation 912, with receiving a first processing result from the first accelerator resource corresponding to the first data. The process optionally continues at operation 914, with staging the first processing result. The process optionally continues at operation 916, with receiving a third hardware-agnostic instruction to receive the first processing result from the child rank. The process optionally continues at operation 918, with forwarding the first processing result to the host application.

Although the operations of FIGS. 8 and 9 are illustrated in a series, this is for illustrative purposes and the operations are not necessarily order dependent. Some operations may be performed in a different order than that presented. Further, processes within the scope of this disclosure may include fewer or more steps than those illustrated in FIGS. 8 and 9.

V. Computer System

Figure 10:
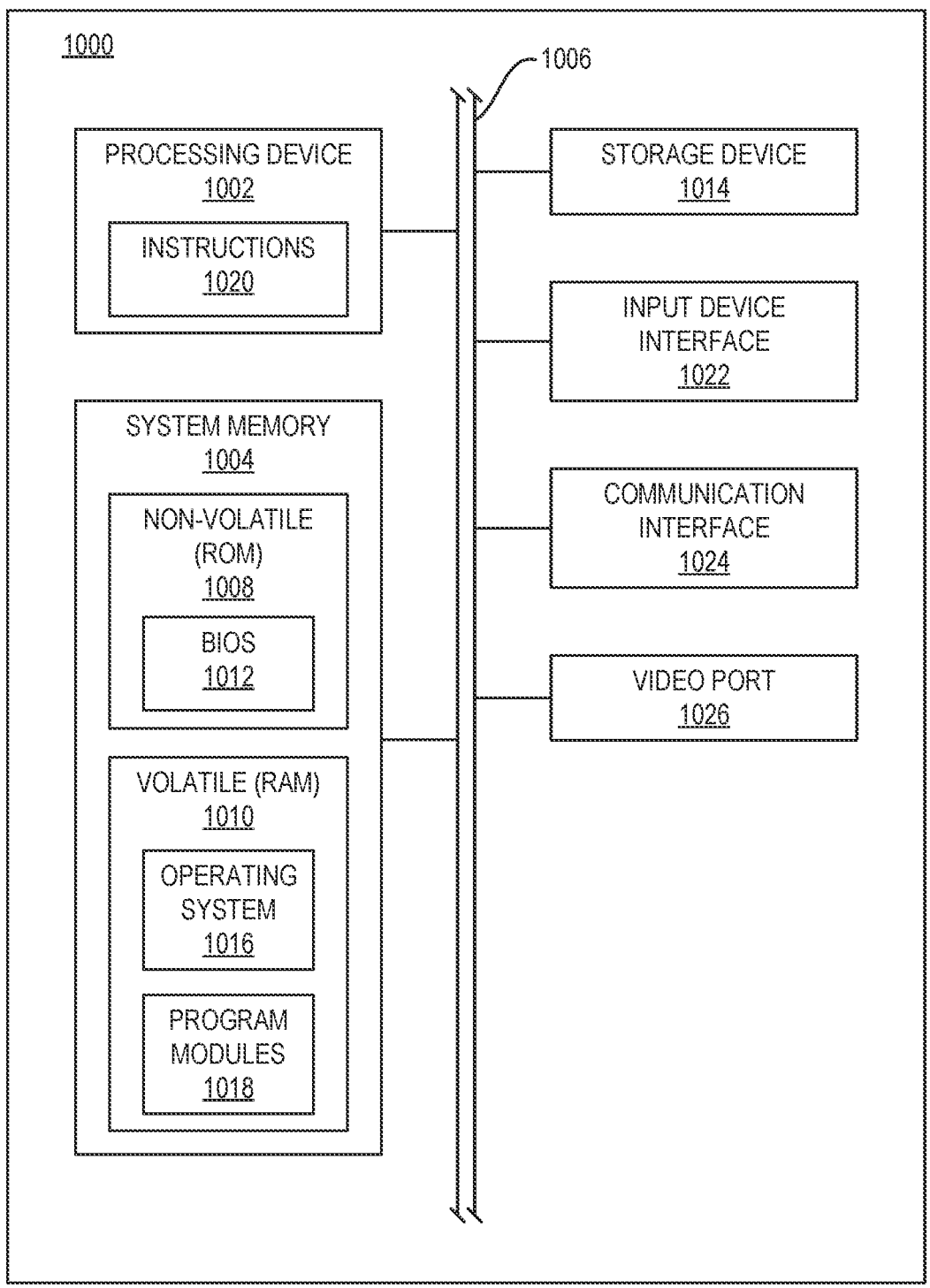
FIG. 10 is a block diagram of a computer system using a $C^2MPI$ interface according to embodiments disclosed herein.

FIG. 10 is a block diagram of a computer system 1000 using a $C^2MPI$ interface according to embodiments disclosed herein. The computer system 1000 can communicate with or be implemented as a heterogeneous computing system. The computer system 1000 comprises any computing or electronic device capable of including firmware, hardware, and/or executing software instructions that could be used to perform any of the methods or functions described above, such as providing or receiving instructions for an application via a $C^2MPI$ interface. In this regard, the computer system 1000 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1000 in this embodiment includes a processing device 1002 or processor, a system memory 1004, and a system bus 1006. The system memory 1004 may include non-volatile memory 1008 and volatile memory 1010. The non-volatile memory 1008 may include read-only memory (ROM), erasable programmable read-only memory (EPROM), electrically erasable programmable read-only memory (EEPROM), and the like. The volatile memory 1010 generally includes random-access memory (RAM) (e.g., dynamic random-access memory (DRAM), such as synchronous DRAM (SDRAM)). A basic input/output system (BIOS) 1012 may be stored in the non-volatile memory 1008 and can include the basic routines that help to transfer information between elements within the computer system 1000.

The system bus 1006 provides an interface for system components including, but not limited to, the system memory 1004 and the processing device 1002. The system bus 1006 may be any of several types of bus structures that may further interconnect to a memory bus (with or without a memory controller), a peripheral bus, and/or a local bus using any of a variety of commercially available bus architectures.

The processing device 1002 represents one or more commercially available or proprietary general-purpose processing devices, such as a microprocessor, CPU, or the like. More particularly, the processing device 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. Examples of the processing device 1002 may include a Host CPU node, a CPU cluster, an FPGA or FPGA cluster, GPU or GPU cluster, or a TPU or TPU cluster. The processing device 1002 may also be an application-specific integrated circuit (ASIC), for example. The processing device 1002 is configured to execute processing logic instructions for performing the operations and steps discussed herein.

In this regard, the various illustrative logical blocks, modules, and circuits described in connection with the embodiments disclosed herein may be implemented or performed with the processing device 1002, which may be a microprocessor, FPGA, a digital signal processor (DSP), an ASIC, or other programmable logic device, a discrete gate or transistor logic, discrete hardware components, or any combination thereof designed to perform the functions described herein. Furthermore, the processing device 1002 may be a microprocessor, or may be any conventional processor, controller, microcontroller, or state machine. The processing device 1002 may also be implemented as a combination of computing devices (e.g., a combination of a DSP and a microprocessor, a plurality of microprocessors, one or more microprocessors in conjunction with a DSP core, or any other such configuration).

The computer system 1000 may further include or be coupled to a non-transitory computer-readable storage medium, such as a storage device 1014, which may represent an internal or external hard disk drive (HDD), flash memory, or the like. The storage device 1014 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1016 and any number of program modules 1018 or other applications can be stored in the volatile memory 1010, wherein the program modules 1018 represent a wide array of computer-executable instructions corresponding to programs, applications, functions, and the like that may implement the functionality described herein in whole or in part, such as through instructions 1020 on the processing device 1002. The program modules 1018 may also reside on the storage mechanism provided by the storage device 1014. As such, all or a portion of the functionality described herein may be implemented as a computer program product stored on a transitory or non-transitory computer-usable or computer-readable storage medium, such as the storage device 1014, volatile memory 1008, non-volatile memory 1010, instructions 1020, and the like. The computer program product includes complex programming instructions, such as complex computer-readable program code, to cause the processing device 1002 to carry out the steps necessary to implement the functions described herein.

An operator, such as the user, may also be able to enter one or more configuration commands to the computer system 1000 through a keyboard, a pointing device such as a mouse, or a touch-sensitive surface, such as the display device, via an input device interface 1022 or remotely through a web interface, terminal program, or the like via a communication interface 1024. The communication interface 1024 may be wired or wireless and facilitate communications with any number of devices via a communications network in a direct or indirect fashion. An output device, such as a display device, can be coupled to the system bus 1006 and driven by a video port 1026. Additional inputs and outputs to the computer system 1000 may be provided through the system bus 1006 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for providing instructions for a host application to a heterogeneous computing system via a compute-centric message passing interface ($C^2MPI$), the method comprising:
   providing a first hardware-agnostic instruction to invoke a first child rank corresponding to a first accelerator resource, wherein the first hardware-agnostic instruction specifies a first computational function,
   wherein the $C^2MPI$ includes application parent ranks defined inside a hardware-agnostic region of the host application, and accelerator parent ranks, the application parent ranks and the accelerator parent ranks managing child ranks, the accelerator parent ranks performing hardware management, kernel retrieval, registration, and execution and maintaining of system resources allocated by the application parent ranks, and
   wherein the application parent ranks and the accelerator parent ranks allocate and deallocate the child ranks based on a duration of execution time of the host application or the first accelerator resource, one of the child ranks being associated with the first accelerator resource after allocation.

2. The method of claim 1, further comprising providing a second hardware-agnostic instruction to send first data to the first child rank for processing.

3. The method of claim 2, wherein the second hardware-agnostic instruction is sent in response to receiving the first child rank.

4. The method of claim 2, further comprising providing a third hardware-agnostic instruction to receive a first processing result from the first child rank.

5. The method of claim 1, further comprising providing a second hardware-agnostic instruction to invoke a second child rank corresponding to a second accelerator resource.

6. The method of claim 5, wherein the second hardware-agnostic instruction specifies the first computational function.

7. The method of claim 5, wherein the second hardware-agnostic instruction specifies a second computational function different from the first computational function.

8. The method of claim 5, further comprising:
   providing a third hardware-agnostic instruction to send first data to the first child rank for processing; and
   providing a fourth hardware-agnostic instruction to send second data to the second child rank for processing.

9. The method of claim 8, wherein the third hardware-agnostic instruction and the fourth hardware agnostic instruction allow for parallel execution of the first child rank and the second child rank.

10. The method of claim 8, wherein the third hardware-agnostic instruction and the fourth hardware agnostic instruction require pipeline execution of the first child rank and the second child rank.

11. A method for executing instructions for an application on a heterogeneous computing system received via a compute-centric message passing interface ($C^2MPI$), the method comprising:
    receiving, from a host application, a first hardware-agnostic instruction to invoke a first child rank corresponding to a first accelerator resource, wherein the first hardware-agnostic instruction specifies a first computational function; and
    locating the first accelerator resource based on the first computational function,
    wherein the $C^2MPI$ includes application parent ranks, inside a hardware-agnostic region of the application, and accelerator parent ranks, the application parent ranks and the accelerator parent ranks managing child ranks, the accelerator parent ranks performing hardware management, kernel retrieval, registration, and execution and maintaining of system resources allocated by the application parent ranks, and
    wherein the application parent ranks and the accelerator parent ranks allocate and deallocate the child ranks based on a duration of execution time of the application or the first accelerator resource, one of the child ranks being associated with the first accelerator resource after allocation.

12. The method of claim 11, wherein the first accelerator resource corresponds to one or a set of accelerators programmed to execute the first computational function.

13. The method of claim 12, wherein the set of accelerators programmed to execute the first computational function comprise a same type of accelerator.

14. The method of claim 12, wherein the set of accelerators programmed to execute the first computational function comprise heterogeneous types of accelerators.

15. The method of claim 11, further comprising:
    invoking the first child rank using the first accelerator resource; and returning the first child rank to the host application.

16. The method of claim 11, wherein locating the first accelerator resource comprises selecting a type of accelerator suitable for executing the first computational function.

17. The method of claim 16, wherein selecting the type of accelerator suitable for executing the first computational function comprises selecting the type of accelerator having a pre-selected performance for executing the first computational function.

18. The method of claim 16, wherein locating the first accelerator resource further comprises:
    identifying an available one of the type of accelerator suitable for executing the first computational function; and
    reserving the available one of the type of accelerator suitable for executing the first computational function as the first accelerator resource.

19. The method of claim 11, further comprising:
    receiving a second hardware-agnostic instruction to send first data to the first child rank for processing; and
    forwarding the first data to the first accelerator resource.

20. The method of claim 19, further comprising receiving a first processing result from the first accelerator resource corresponding to the first data.

21. The method of claim 20, further comprising staging the first processing result.

22. The method of claim 20, further comprising:
receiving a third hardware-agnostic instruction to receive the first processing result from the child rank; and
forwarding the first processing result to the host application.

23. A non-transitory computer-readable medium having stored thereon software instructions that, when executed by a processor, cause the processor to:
receive, from a host application, a first hardware-agnostic instruction to invoke a first child rank corresponding to a first accelerator resource, wherein the first hardware-agnostic instruction specifies a first computational function;
locate the first accelerator resource based on the first computational function;
invoke the first child rank; and
return the first child rank to the host application,
wherein the $C^2MPI$ includes application parent ranks, inside a hardware-agnostic region of the application, and accelerator parent ranks, the application parent ranks and the accelerator parent ranks managing child ranks, the accelerator parent ranks performing hardware management, kernel retrieval, registration, and execution and maintaining of system resources allocated by the application parent ranks, and
wherein the application parent ranks and the accelerator parent ranks allocate and deallocate the child ranks based on a duration of execution time of the application or the first accelerator resource, one of the child ranks being associated with the first accelerator resource after allocation.

* * * * *